(12) United States Patent
Ravnaas

(10) Patent No.: US 9,045,898 B2
(45) Date of Patent: Jun. 2, 2015

(54) WALL AND CEILING SOUND DAMPING MOUNTS AND CHANNELS

(75) Inventor: Brian Ravnaas, West Fargo, ND (US)

(73) Assignee: SAINT-GOBAIN PERFORMANCE PLASTICS CORPORATION, Aurora, OH (US)

( * ) Notice: Subject to any disclaimer, the term of this patent is extended or adjusted under 35 U.S.C. 154(b) by 0 days.

(21) Appl. No.: 12/466,915

(22) Filed: May 15, 2009

(65) Prior Publication Data
US 2009/0283359 A1    Nov. 19, 2009

Related U.S. Application Data

(60) Provisional application No. 61/053,382, filed on May 15, 2008.

(51) Int. Cl.
| | |
|---|---|
| E04B 1/82 | (2006.01) |
| E04B 9/00 | (2006.01) |
| E04B 2/00 | (2006.01) |
| E04B 1/38 | (2006.01) |
| E04B 2/74 | (2006.01) |
| E04B 9/24 | (2006.01) |
| F16F 15/00 | (2006.01) |

(52) U.S. Cl.
CPC ........... *E04B 1/82* (2013.01); *E04B 2/7409* (2013.01); *E04B 2/7457* (2013.01); *E04B 9/001* (2013.01); *E04B 9/245* (2013.01); *E04B 2001/8272* (2013.01); *E04B 2002/7466* (2013.01); *F16F 15/00* (2013.01)

(58) Field of Classification Search
CPC ....... E04B 9/245; E04B 9/001; E04B 2/7457; E04B 1/82; E04B 2001/8272; E04B 2002/7466; E04B 2/7409; E04B 1/84

USPC .......... 52/144, 145, 476, 483.1, 489.1, 489.2, 52/783.1, 506.05, 506.06, 509, 510, 511, 52/512, 481.1, 403.1, 714, 715; 181/208
See application file for complete search history.

(56) References Cited

U.S. PATENT DOCUMENTS

| | | | | |
|---|---|---|---|---|
| 2,097,988 A | * | 11/1937 | Ross et al. | 52/287.1 |
| 2,841,255 A | * | 7/1958 | Kemp | 52/395 |
| 3,708,941 A | * | 1/1973 | Cuckson | 52/506.08 |
| 4,078,348 A | | 3/1978 | Rothman | |
| 4,214,688 A | * | 7/1980 | Griffin, Jr. | 224/197 |

(Continued)

FOREIGN PATENT DOCUMENTS

| | | |
|---|---|---|
| EP | 0652337 A1 | 5/1995 |
| GB | 2428705 A | 2/2007 |

(Continued)

OTHER PUBLICATIONS

International Search Report from PCT Application No. PCT/US2009/044162, Filed May 15, 2009, 1 pg.

*Primary Examiner* — Phi A
*Assistant Examiner* — Omar Hijaz
(74) *Attorney, Agent, or Firm* — Abel Law Group, LLP; Chi Suk Kim

(57) ABSTRACT

A sound damping device includes an attachment portion, an engagement structure to engage a furring channel, and a shoulder disposed between the attachment portion and the engagement structure. The sound damping device has a spring rate of not greater than 12,000 kg/m. The sound damping device may be disposed between a support structure and a sheet material.

15 Claims, 13 Drawing Sheets

(56) References Cited

U.S. PATENT DOCUMENTS

| | | | |
|---|---|---|---|
| 4,376,361 A | 3/1983 | Michael | |
| 4,656,794 A * | 4/1987 | Thevenin et al. | 52/22 |
| 4,704,835 A * | 11/1987 | Jordan | 52/489.1 |
| 4,719,730 A * | 1/1988 | Winkowski | 52/238.1 |
| 4,828,202 A * | 5/1989 | Jacobs et al. | 244/117 R |
| 5,060,434 A * | 10/1991 | Allison | 52/238.1 |
| 5,535,566 A | 7/1996 | Wilson et al. | |
| 5,632,128 A * | 5/1997 | Agar | 52/489.2 |
| 5,661,273 A * | 8/1997 | Bergiadis | 181/290 |
| 6,029,418 A | 2/2000 | Wright | |
| 6,115,981 A | 9/2000 | Counihan | |
| 6,125,608 A | 10/2000 | Charlson | |
| 6,267,347 B1 | 7/2001 | Ryan et al. | |
| 6,668,510 B2 | 12/2003 | McManus | |
| 6,837,019 B2 * | 1/2005 | Collie | 52/712 |
| 7,093,814 B2 | 8/2006 | Meisel et al. | |
| 7,191,570 B1 * | 3/2007 | Eaton | 52/506.09 |
| 7,743,572 B2 * | 6/2010 | Ducharme | 52/506.06 |
| 7,743,575 B2 * | 6/2010 | Ito | 52/582.1 |
| 2001/0037621 A1 * | 11/2001 | Seng | 52/731.1 |
| 2004/0005963 A1 * | 1/2004 | Tudor | 482/83 |
| 2005/0201571 A1 | 9/2005 | Saint-Vincent et al. | |
| 2008/0086966 A1 * | 4/2008 | Stevens et al. | 52/347 |
| 2008/0202846 A1 * | 8/2008 | Gernhart | 181/208 |
| 2008/0264602 A1 | 10/2008 | Newberry | |

FOREIGN PATENT DOCUMENTS

| | | |
|---|---|---|
| JP | 48-37909 | 6/1973 |
| JP | 50-43942 | 12/1975 |
| JP | 62-164934 | 1/1986 |
| JP | 2001-173131 | 6/2001 |
| KR | 20-1994-0005745 U | 3/1994 |
| KR | 20-0351327 Y1 | 5/2004 |
| WO | 97/01683 | 1/1997 |
| WO | 0052277 | 9/2000 |
| WO | 0116440 | 3/2001 |
| WO | 2005/024148 A1 | 3/2005 |
| WO | 2005024148 A1 | 3/2005 |
| WO | 2005/031080 | 4/2005 |
| WO | 2008005544 | 1/2008 |
| WO | 2008007986 | 1/2008 |
| WO | 2008014173 | 1/2008 |
| WO | 2008124672 | 10/2008 |

* cited by examiner

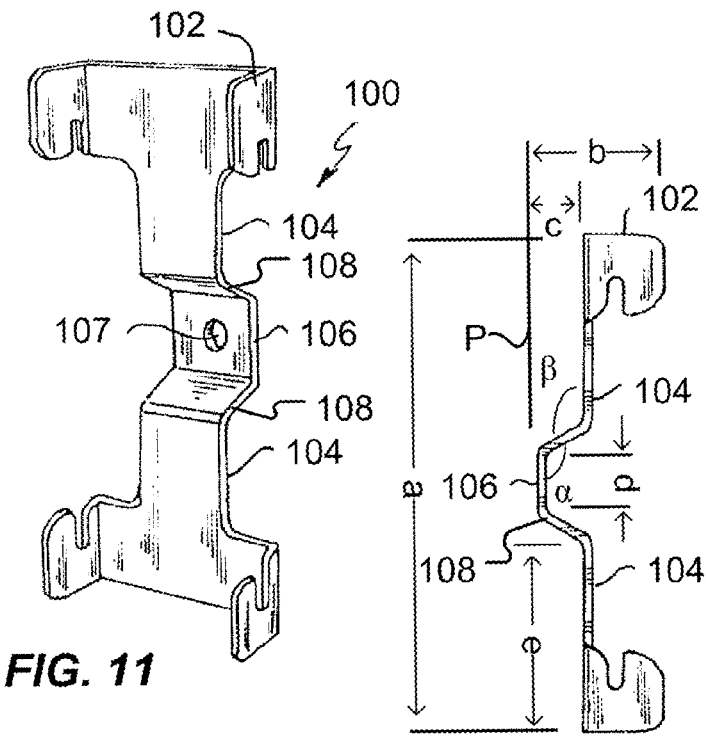
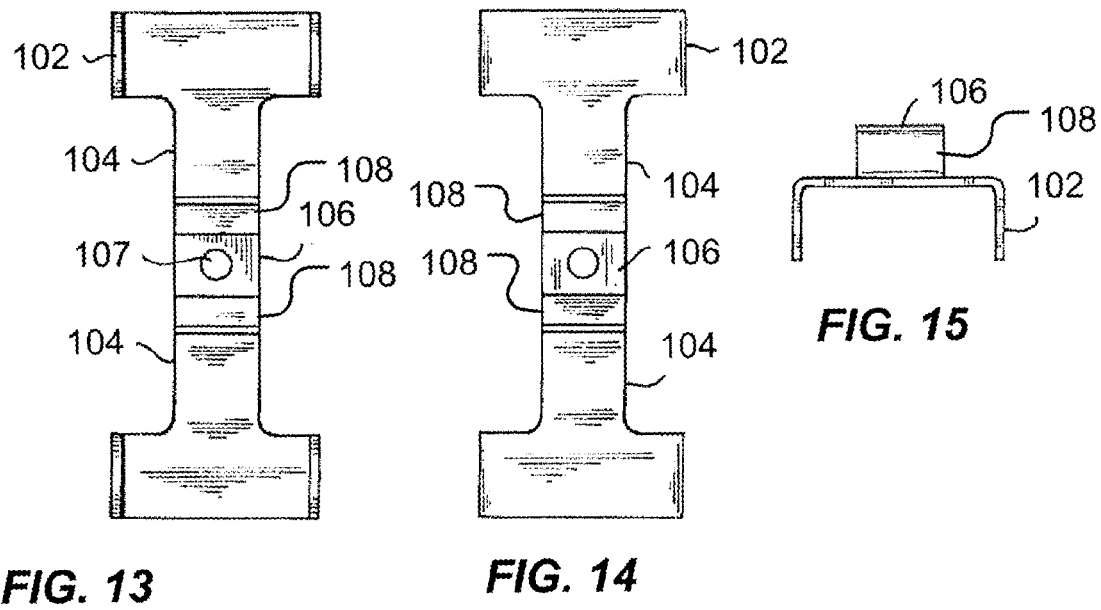
FIG. 11  FIG. 12
FIG. 13  FIG. 14  FIG. 15

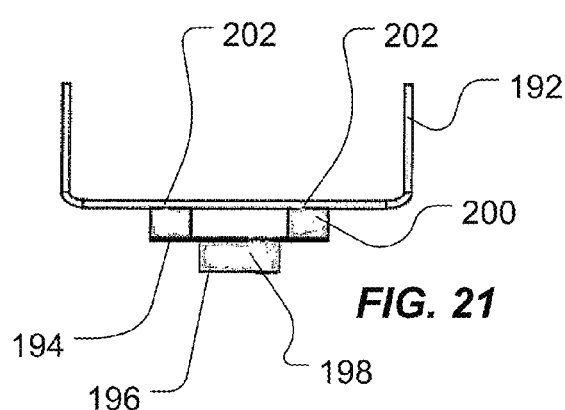
FIG. 21
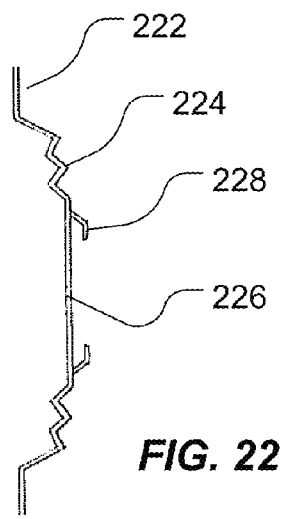
FIG. 22
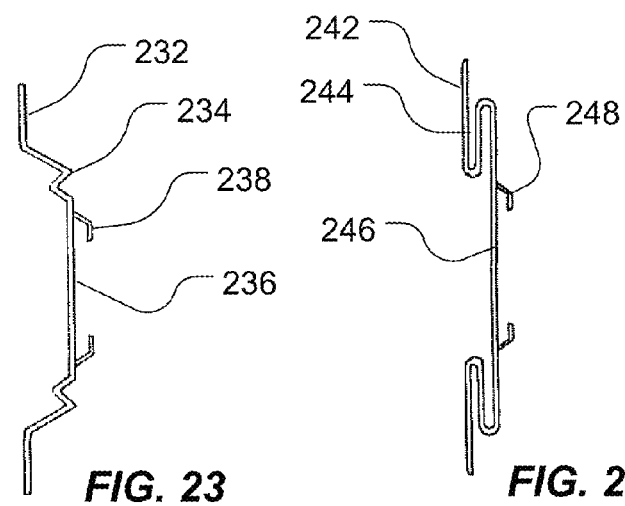
FIG. 23
FIG. 24
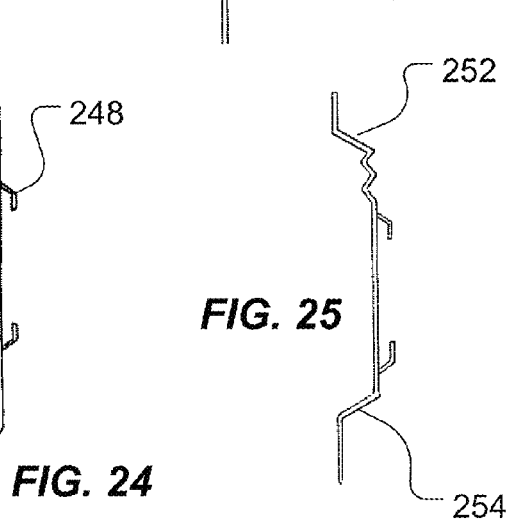
FIG. 25
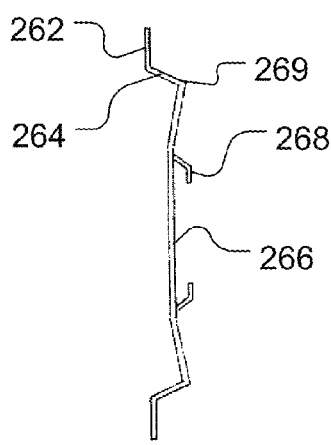
FIG. 26
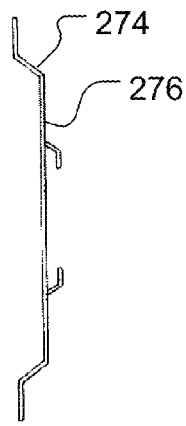
FIG. 27
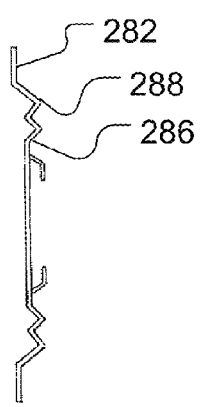
FIG. 28

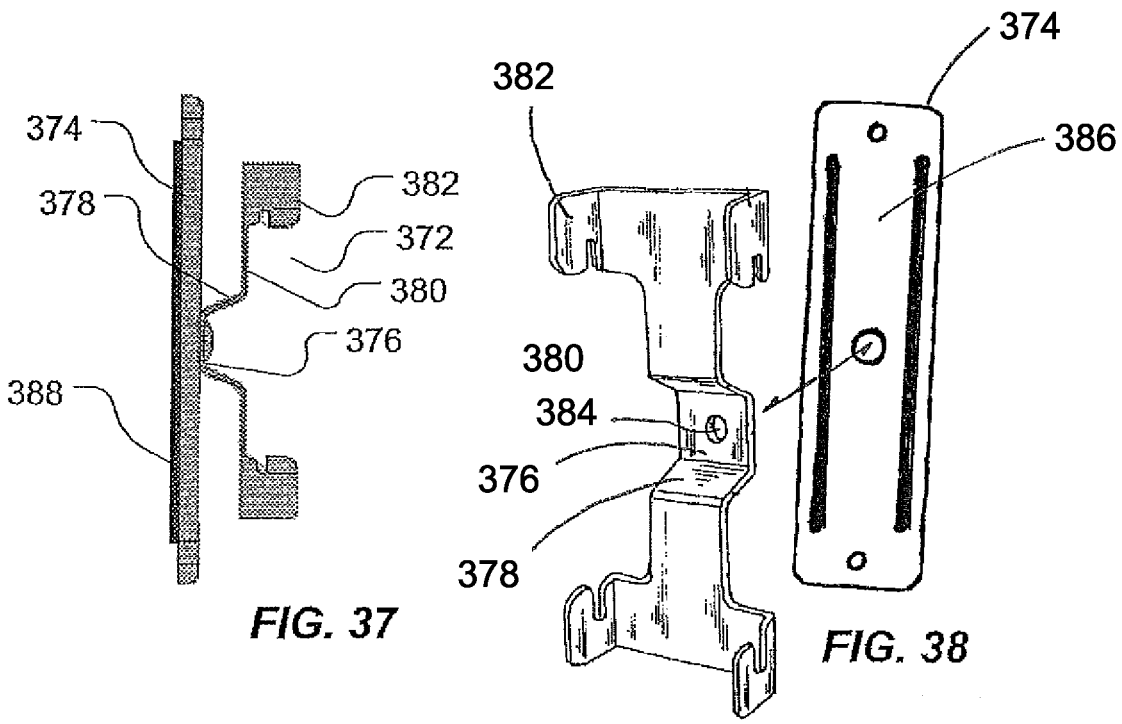
FIG. 37
FIG. 38
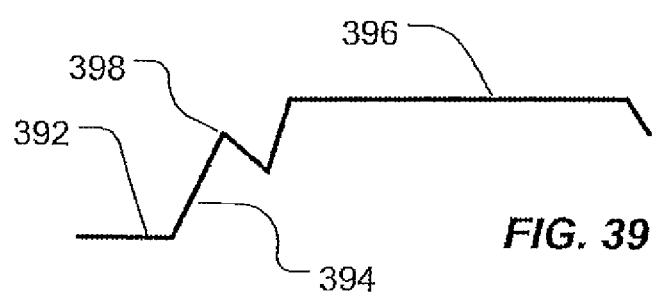
FIG. 39
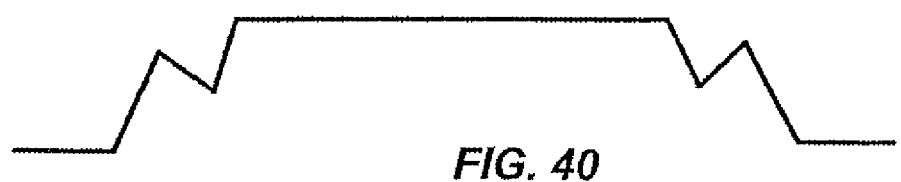
FIG. 40
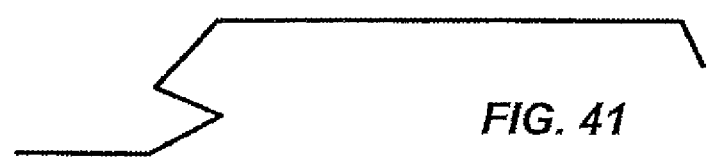
FIG. 41

WALL AND CEILING SOUND DAMPING MOUNTS AND CHANNELS

CROSS-REFERENCE TO RELATED APPLICATION(S)

The present application claims priority from U.S. Provisional Patent Application No. 61/053,382, filed May 15, 2008, entitled "WALL AND CEILING STUD SOUND ISOLATION MOUNT," naming inventor Brian Ravnaas, which application is incorporated by reference herein in its entirety.

FIELD OF THE DISCLOSURE

This disclosure, in general, relates to devices for sound damping, particularly useful in wall and ceiling construction.

BACKGROUND

In conventional construction, sheet materials are attached to support structures to form walls or ceilings. When sheet materials, such as dry wall or gypsum board, are attached to the support structure using screws or nails, sound can be transmitted through the sheet material and into the support structure. The waves associated with the sound can then be transmitted throughout the support structure, such as to adjacent rooms or to other spaces in communication with the support structure. Such transmission of sound results in an increase in ambient noise within a building. A cacophony resulting therefrom is of particular concern in close quarter residence and business settings.

For example, FIG. 1 includes an illustration of a conventional wall construction that includes studs or support structures 10, a sheet material 12 on one side of the support structure 10 and a sheet material 14 on the other side of the support structure 10. As illustrated, the sheet materials 12 and 14 are secured directly to the support structure 10. As illustrated in FIG. 2, sound waves 16 that contact the sheet material 14 traverse through the support structure 10 and exit the sheet material 12 to produce sound waves 18. Accordingly, direct connection of sheet materials to the support structure offers little or limited attenuation or damping of the sound traversing from one side of a wall to another.

As such, builders have turned to the use of sound damping techniques in construction projects where noise is of concern. However, conventional sound damping techniques are less effective at lower frequencies. With trends in music lending to an increasing amount of low frequency sound generation and with the on going use of equipment, such as air conditioning systems and refrigerator compressors, that produces low frequency sound vibrations, improved sound damping, particularly at lower frequencies is of great concern.

As such, an improved sound damping system would be desirable.

BRIEF DESCRIPTION OF THE DRAWINGS

The present disclosure may be better understood, and its numerous features and advantages made apparent to those skilled in the art by referencing the accompanying drawings.

FIG. 11, FIG. 12, FIG. 13, FIG. 14 and FIG. 15 include illustrations of an exemplary sound damping device.

FIG. 19, FIG. 20, and FIG. 21 include illustrations of an exemplary sound damping device.

FIG. 22, FIG. 23, FIG. 24, FIG. 25, FIG. 26, FIG. 27, FIG. 28, FIG. 29, FIG. 30, FIG. 31, FIG. 32, FIG. 33, and FIG. 34 include illustrations of further exemplary sound damping devices.

FIG. 37 and FIG. 38 include illustrations of a further exemplary sound damping device.

FIG. 39, FIG. 40, FIG. 41, FIG. 42, FIG. 43, FIG. 44, and FIG. 45 include illustrations of exemplary furring channels.

The use of the same reference symbols in different drawings indicates similar or identical items.

DESCRIPTION OF THE PREFERRED EMBODIMENT(S)

In a particular embodiment, a sound damping device may include a first portion for coupling directly to a support structure or to a portion that couples to the support structure, a second portion that may flex in a direction perpendicular to the plane of the sheet material, and a third portion that connects to the sheet material or to a furring channel or other structure connected to the sheet material. In use, the sound damping system may include a sheet material connected to a furring channel, for example, with a fastener, such as a nail or screw. The furring channel may be connected to a sound damping device, and the sound damping device may be connected to a support structure, such as a beam or a stud. Alternatively, the sheet material may be attached directly to the sound damping device. In another example, the sound damping device may be connected to a base that is connected to the support structure or stud.

Figure 1:
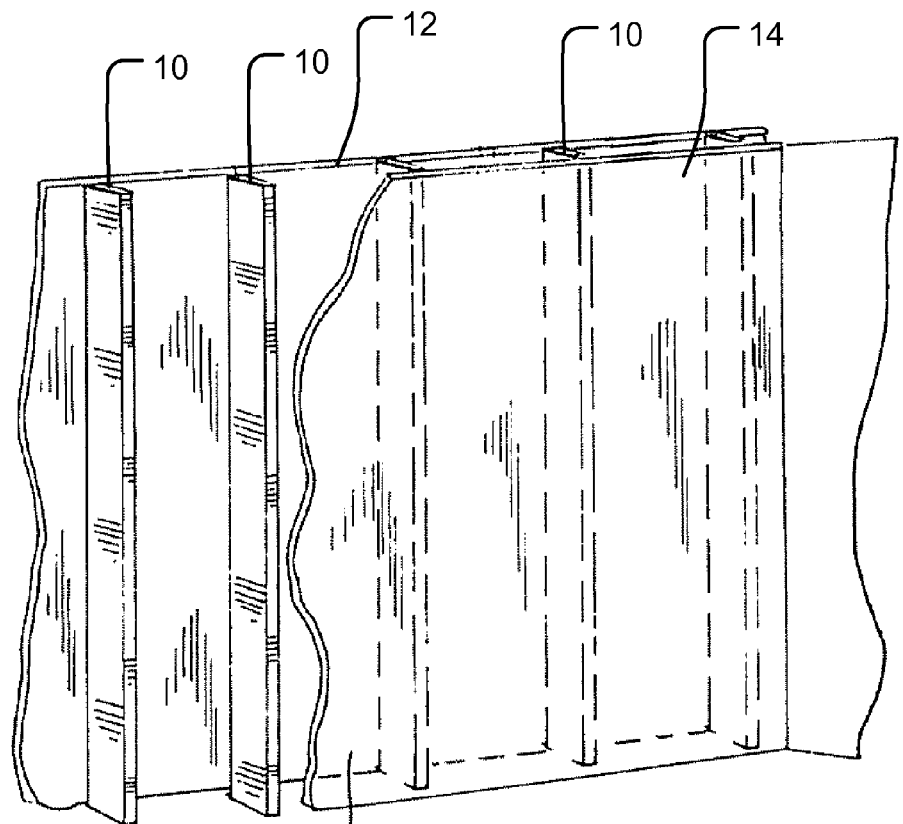
FIG. 1 and FIG. 2 include illustrations of prior art wall and ceiling construction.
Figure 2:
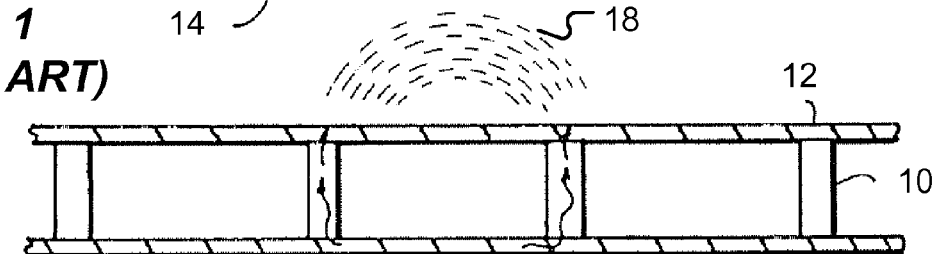
Figure 3:
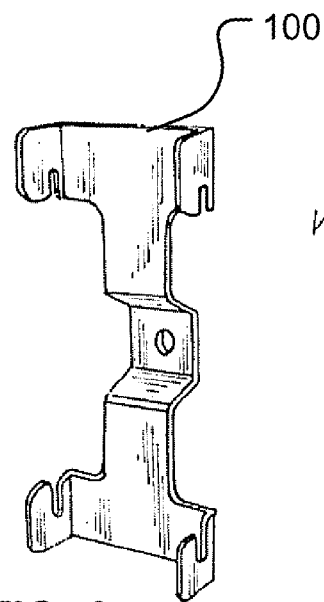
FIG. 3 includes an illustration of an exemplary sound damping device.
Figure 4:
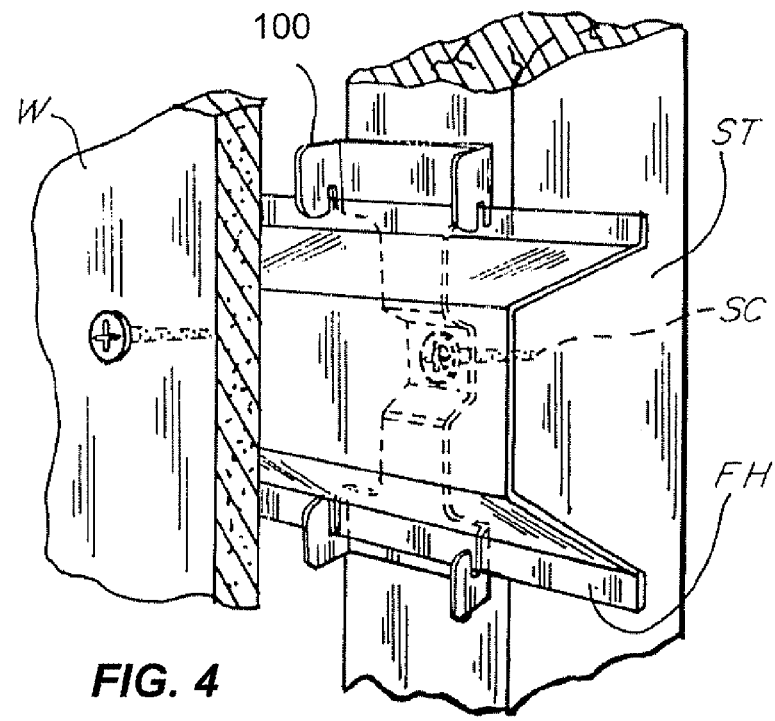
FIG. 4, FIG. 5, FIG. 6, FIG. 7, FIG. 8, FIG. 9, and FIG. 10 include illustrations of exemplary sound damping systems.

In an exemplary embodiment, FIG. 3 includes an illustration of an exemplary sound damping device 100. As illustrated in FIG. 4, the sound damping device 100 may be attached or coupled to a support structure (ST). In an example, the support structure (ST) may be a wood stud or a metal frame. As illustrated, the sound damping device 100 is coupled the support structure ST using a screw SC. Alternatively, the sound damping device 100 may be coupled to the support structure ST using other fastening devices, such as nails, bolts, or rivets, or by using adhesive. In an alternative embodiment, the sound dampening device 100 may be coupled to a base, which is coupled to the support structure ST. As further illustrated in FIG. 4, a furring channel FH is connected to the sound damping device 100 and a wall W is fastened to the furring channel FH. For example, the wall W may be fastened to the furring channel FH using a fastener, such as a screw, nail, bolt, or rivet. Alternatively, the wall W may be coupled to the furring channel FH using and adhesive. The wall W may include wood, plywood, gypsum board, cement board, plaster board, wallboard, gyproc, sheetrock, drywall, or any combination thereof.

Figure 5:
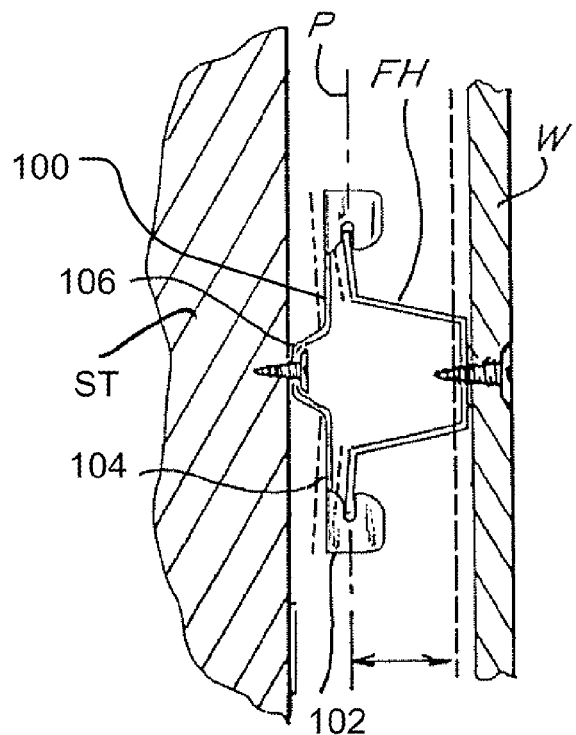

Turning to FIG. 5, the sound damping device 100 flexes in response to vibrations, dissipating waves, such as sound waves. As illustrated, the furring channel FH is positioned within notches of engagement structures 102, securing the furring channel FH to the sound damping device 100. The wings 104 are connected by a shoulder to an attachment portion 106 secured to the support structure ST. In the illustrated embodiment, the wings 104 substantially align with a plane P that is parallel to the wall W and the support structure ST when static. In response to the vibrations, the wings 104 flex and to some extent the feet of the furring channel FH flex out of alignment with the plane P in a direction perpendicular to the wall W and the support structure ST, dissipating sound waves.

Figure 6:
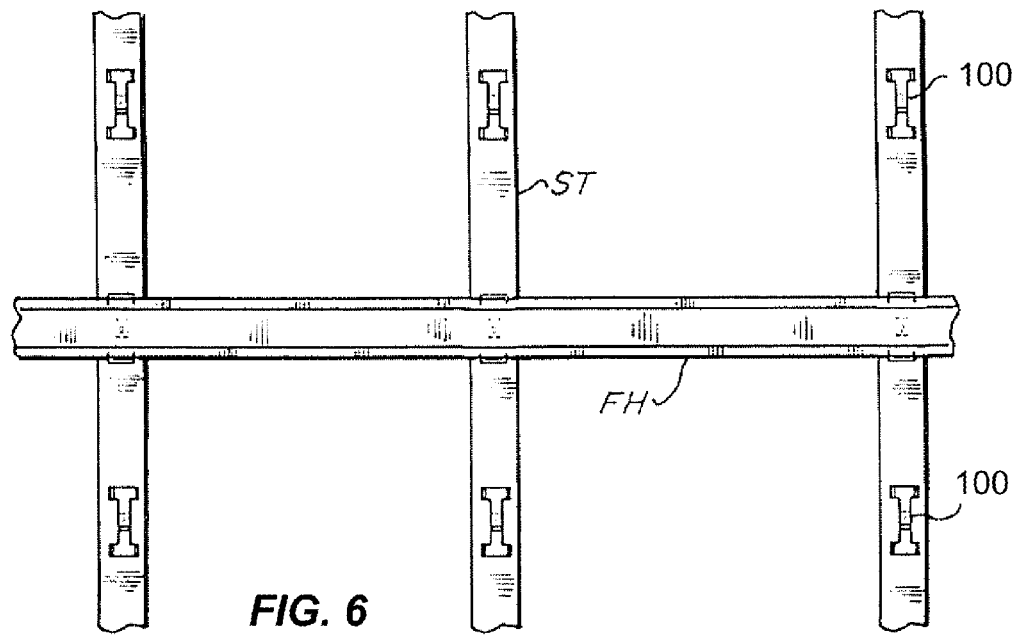
Figure 7:
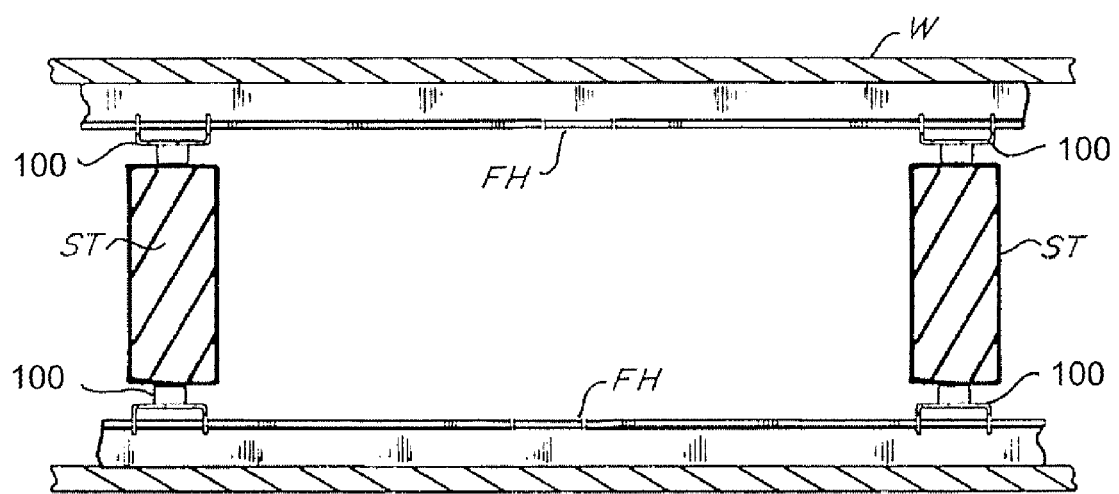

As illustrated in FIG. 6 and FIG. 7, one side of the support structure may include several sound damping devices 100. Across support structures ST, sets of sound damping devices may be aligned so that a furring channel FH is coupled to a sound damping device on each of the support structures ST. As illustrated in FIG. 7, sound damping devices 100 may be located on either side of support structure providing damping to both walls on opposite sides of the support structure ST. Alternatively, the sound damping device may be located on one side of the support structure ST.

Figure 8:
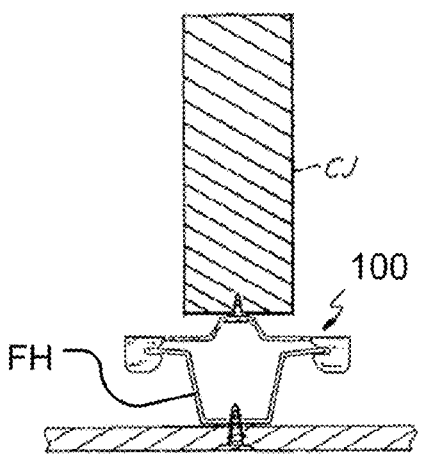
Figure 9:
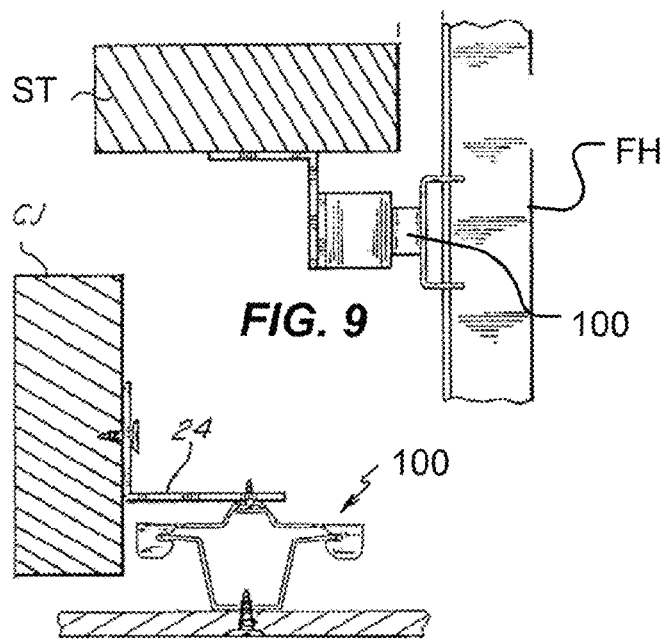
Figure 10:
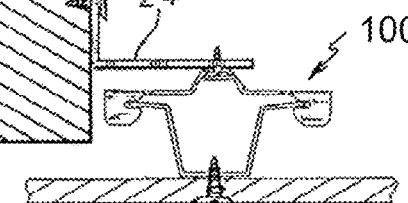

In additional embodiments illustrated in FIG. 8, FIG. 9 and FIG. 10, the sound damping device 100 may be connected to a ceiling joint or support structure in various arrangements. For example, FIG. 8 illustrates the sound damping device 100 connected to a ceiling joint CJ such that a furring channel FH aligns parallel to the ceiling joint CJ. As illustrated in FIG. 9, a sound damping device 100 may be connected to a furring channel FH and may be connected to brace or other fitting connected to the side of a support structure ST. FIG. 10 includes an illustration of an alternative example of a connection to a ceiling joint CJ using an angled support or brace 24. In each example, the sound damping device 100 is configured to flex in a direction perpendicular to a plane defined by the sheet material of the wall or ceiling, resulting in the dissipation of sound waves.

FIG. 11, FIG. 12, FIG. 13, FIG. 14, and FIG. 15 include illustrations of a particular embodiment of a sound damping device 100. As illustrated, the sound damping device 100 includes an attachment portion 106 connected to a coupling platform, such as wings 104, by shoulders 108. Each of the wings 104 includes engagement structures 102 to engage a furring channel. As illustrated, the attachment portion 106 may include a hole 107 for receiving a fastener, such as a screw, bolt, rivet, or nail, to secure the attachment portion 106 to a base or a support structure. Alternatively, the attachment portion may be secured to a base or a support structure using adhesive.

As illustrated in FIG. 12, the attachment portion 106 lies within a plane P. Within the plane P, the shoulders 108 are positioned on opposite sides of the attachment portion 106. The shoulders extend out of the plane P from the same side or surface of the plane P at an angle α relative to the attachment portion 106. In particular, the angle α defined between the attachment portion 106 and the shoulder 108 is not greater than 175°, such as not greater than 165°, not greater than 145°, not greater than 135°, or even not greater than 120°.

The wings 104 are formed at an angle β relative to the shoulder 108 and extend from their respective shoulders 108 in opposite directions substantially parallel to the plane P. For example, when β is in a range of 0.8 α to 1.2 α, such as a range of 0.9 α to 1.1 α, the wings are substantially parallel to the attachment portion 106. In particular, the angle β defined between the wings 104 and the shoulders 108 is not greater than 175°, such as not greater than 165°, not greater than 145°, not greater than 135°, or even not greater than 120°.

In an exemplary embodiment, the total length (a), defined parallel to the plane P, of the sound damping device 100 is in the range of 2 inches to 10 inches. For example, the total length may be in a range of 2 inches to 6 inches, such as a range of 2 inches to 5 inches, or even a range of 2 inches to 4 inches. The height (b) of the sound damping device 100, defined perpendicular to the plane P, may be in a range of 0.1 inches to 5 inches, such as a range of 0.1 inches to 3 inches, or even a range of 0.3 inches to 2 inches. The height (c) of the wing 104 relative to the attachment portion 106 may be in a range of 0.1 inches to 1 inch, such as a range of 0.2 inches to 0.7 inches, or even a range of 0.3 inches to 0.5 inches. In an example, the length (d) of the attachment portion 106 may be in a range of 0.2 inches to 1.5 inches, such as a range of 0.4 inches to 1 inch. The length (e) of the wing 104 may be in a range of 0.5 inches to 4 inches, such is a range 0.5 inches to 3, or even a range of 0.5 inches to 2 inches. In particular example, the ratio of the length (e) to the length (d) is at least 1.0 or is greater than 1, such as at least 1.05, at least 1.1, at least 1.2, or even at least 1.3.

In an exemplary embodiment, sound damping device 100 and other illustrated embodiments of sound dampening devices can be formed of materials such as metals, polymers, or composite materials. For example, the sound damping devices may be formed of a metal, such as steel, aluminum, bronze, copper, tin, titanium, zinc, alloys thereof, or any combination thereof. Optionally, the metals may be treated or coated, such as with a metal or metal oxide plating or a polymeric coating. Alternatively, the sound dampening device may be formed of a polymeric material, such as a material including a polyolefin, a polyamide, a diene elastomer, a polyester, a polyether, a polyaramide, a polyimide, a silicone, or any combination thereof. Further, the sound dampening device may be formed of a composite material, such a filled polymer, including a filler such as a metal oxide, another polymer, a metal particulate, graphite, a flame retardant, another additive, or any combination thereof, or may be formed of metal/elastomer laminates.

In particular, the illustrated sound dampening devices may be formed by cutting and shaping a sheet of material, such as a metal sheet. For example, the sound damping device 100 may be cut and bent into shape. In particular, the sheet may be cut to form an intermediate piece or component, and the intermediate piece may be bent to form the sound damping device. As illustrated in FIG. 11, the sound damping device 100 may be formed of a single piece of material, such as metal, cut and bent to form the attachment portion 106, shoulders 108, wings 104, and engagement structures 102. Alternatively, the sound damping device may be formed of a moldable material and may be manufactured through a technique, such as injection molding, compression molding, other molding techniques, or any combination thereof.

In a particular example, the sound damping device 100 or other embodiments of sound damping devices may be formed of sheet material having a thickness in a range of 5 gauge to 200 gauge, such as a range of 20 gauge to 150 gauge, a range of 20 gauge to 125 gauge, or even a range of 20 gauge to 100 gauge. In particular, the thickness of the material is selected to provide a balance between flexibility which assists with sound dampening and strength useful for supporting the sheet material. For example, the material may be selected in combination with design to support at least 10 lbs of sheet material, such as at least 20 lbs of sheet material, at least 25 lbs of sheet material, at least 30 lbs of sheet material, at least 35 lbs of sheet material, or even at least 50 lbs of sheet material. The channel is generally configured to support not greater than 100 lbs of sheet material.

In an embodiment, the sound damping device, such as the sound damping device 100 or a sound damping device described below, may have a spring rate of not greater than 40,000 kg/m. The spring rate is the ratio of load to deflection measured using the configuration described in Example 3. In particular, the sound damping device may have a spring rate of not greater than 35,000 kg/m, such as not greater than 30,000 kg/m, not greater than 25,000 kg/m, not greater than 20,000 kg/m, not greater than 15,000 kg/m, not greater than 12,000 kg/m not greater than 10,000 kg/m, or even not greater than 7000 kg/m. In an example, the sound damping device is formed of a sheet metal construction and having a spring rate not greater than 40,000 kg/m. In a further example, the sound damping device is configured to engage a furring channel and has a spring rate of not greater than 15,000 kg/m. In a particular example, the sound damping device has a spring rate of at least 100 kg/m, such as at least 500 kg/m, or even at least 1000 kg/m.

In addition, the sound damping device provides a Resonance Index of not greater than 65 Hz. The Resonance Index is determined as the resonance frequency for a wall including a sheet of ⅝" drywall on each side of a wood frame. The sound damping device is disposed between one of the sheets of ⅝" drywall and a side of the wood frame. In particular, the sound damping device exhibits a Resonance Index of not greater than 60 Hz, such as in a range of 50 Hz to 60 Hz.

Figure 16:
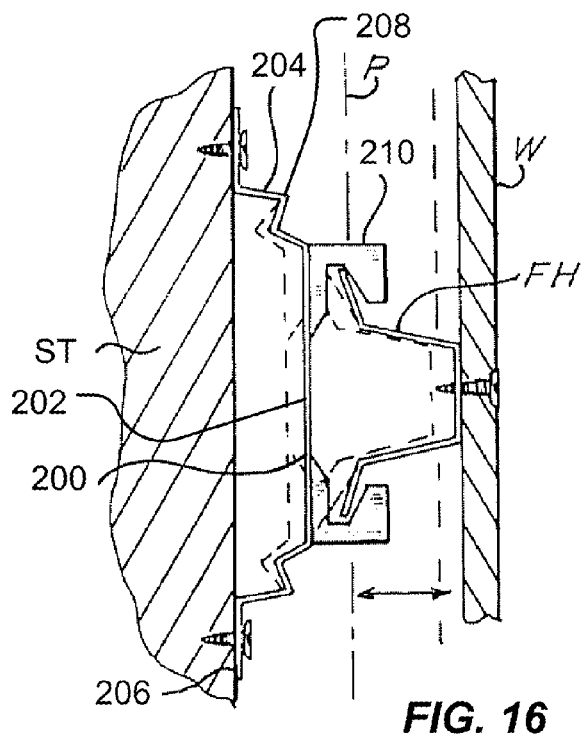
FIG. 16, FIG. 17 and FIG. 18 include illustrations of exemplary sound damping systems.

While the illustrated embodiment of the sound damping device 100 is configured with a single central attachment portion, other embodiments may include one or more attachment portions, such as feet. For example, FIG. 16 includes an illustration of a sound damping device 200, including two feet 206 and a coupling platform 202 attached to the feet by shoulders 204. In the embodiment illustrated in FIG. 16, each of the shoulders 204 includes one or more folds 208 that may flex in response to wave energy, such as sound waves. As illustrated, a wall W is attached to a furring channel FH, which engages structures 210 supported on the coupling platform 202 of the sound damping device 200. The feet 206 of the sound damping device 200 are fastened to a support structure using fasteners, such as nails or screws, or optionally adhesive. In response to sound waves, the sound damping device 200 flexes in a direction perpendicular to the plane P, dissipating the sound waves.

Figure 17:
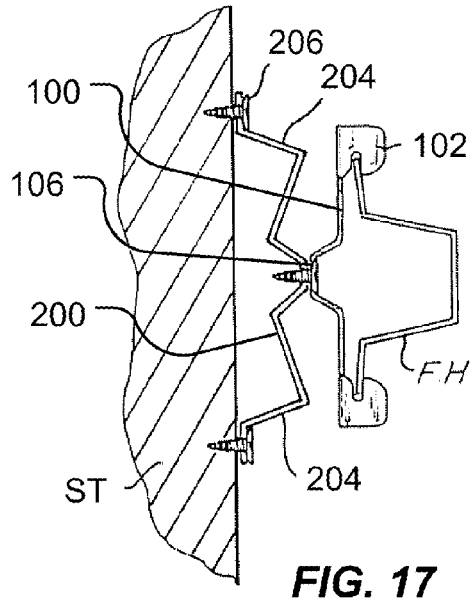
Figure 18:
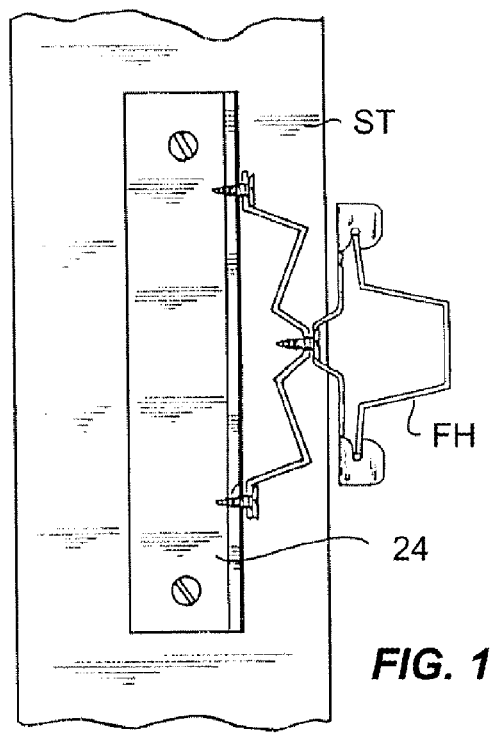

In additional embodiments illustrated in FIG. 17 and FIG. 18, the single attachment point sound damping device and the two footed sound damping devices may be combined to provide improved sound damping. For example, the sound damping device 200 may be coupled to a support structure ST using the two feet 206. A shoulder 204 extending from the feet 206 may support an attachment platform to which the attachment point 106 of sound damping device 100 is attached. The sound damping device 100 may include engagement structures 102 to engage a furring channel FH. In another embodiment illustrated in FIG. 18, the combined sound damping device including sound damping devices 200 and 100 may be coupled to a brace or support.

Figure 19:
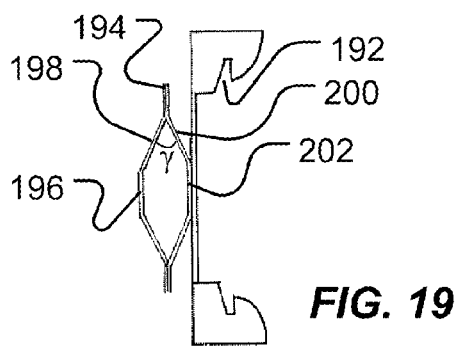
Figure 20:
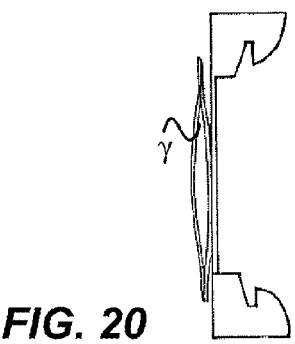

In a further embodiment, a sound damping device illustrated in FIG. 19, FIG. 20, and FIG. 21 may include a single attachment point 196 for attaching to a support structure. A primary shoulder 198 may extend between the attachment point 196 and a wing 194. A secondary shoulder 200 may extend from the wing 194 to a coupling platform 202. The coupling platform 202 may be attached to or may include engagement structures to couple to a furring channel. For example, the sound damping device may include notches 192 into which portions, such as edges, of a furring channel engage. As illustrated in FIG. 20, in response to compressive forces, the angle γ defined between the shoulders 198 and 200 is reduced, permitting movement of the sound damping device in a direction perpendicular to wall structure. In this manner, the sound damping device dissipates wave energy, while limiting transfer of wave energy, such as sound waves, to the support structure.

In a particular example, the sound damping device may be formed by cutting and shaping a sheet material. For example, when viewed from the side view of FIG. 21, a center portion of sheet material is bent to form the attachment portion 196 and the primary shoulders 198. Portions of sheet material adjacent the center portion are bent to form the secondary shoulders 200 and coupling platforms 202.

Given the description above, various design variations may be envisaged. For example, in the embodiment illustrated in FIG. 22, two feet 222 may be connected by a shoulder 224 that includes four folds extending to a platform 226. The platform 226 includes engagement structures 228 to engage a furring channel. In the embodiment illustrated in FIG. 22, the folds open perpendicular to planes parallel to attached sheet material. In an alternative embodiment illustrated in FIG. 23, shoulders 234 extending from feet 232 include two folds supporting a platform 236 that also includes engagement structures 238 for engaging a furring channel. In general, folds are characterized by a change in direction of the material from a side view, which result from bending as opposed to cutting. In particular, the sound damping device may include at least two folds, such as at least three folds, at least four folds, or even at least five folds extending between the attachment portion and the coupling platform.

In a further embodiment illustrated in FIG. 24, a foot 242 is connected to a shoulder 244, taking the form of an s-shape and supporting platform 246, which includes engagement structures 248 for engaging a furring channel. As illustrated, the folds of the s-shape open parallel to the feet. Alternatively, the folds of the s-shape may be configured to open perpendicular to the plane of the feet or platforms or at an angle relative to the plane.

Optionally, the sound damping devices may be asymmetric. In contrast to the embodiments illustrated in FIG. 22, FIG. 23, and FIG. 24, different shoulder designs may be used within the same sound damping device. As illustrated in FIG. 25, a first shoulder 252 includes folds and a second shoulder 254 does not include folds or bends. In a further example, an asymmetric sound damping device may include a first shoulder having a zig-zag pattern and a second shoulder may include s-shaped folds.

Alternatively, the coupling platforms which support the engagement structures for engaging the furring channels may include bends. In particular, if the shoulder is described as extending from the feet, the coupling platform may be described as lying below the top most point of the shoulder. For example as illustrated at FIG. 26, a shoulder 264 extends vertically from a foot 262. The angle of the connection between the shoulder 264 and the coupling platform 266 is such that the coupling platform 266 lies below a topmost point 269 of the shoulder 264. As a result, the engagement structures 268 may also lie below the topmost point 269 of the shoulder 264. Flexing may occur in the coupling platform 266 in a direction perpendicular to a wall being supported by the structure, resulting in a damping of sound waves traversing through the wall. In contrast, FIG. 27 illustrates device in which the coupling platform 276 is flat and in line with the highest point of the shoulder 274. As a result, coupling platform 266 of FIG. 26 is closer to the structure to which feet 262 are attached than the coupling platform 276 of FIG. 27. In a further exemplary embodiment illustrated in FIG. 28, the coupling platform 286 may include a zig-zag pattern similar to the pattern illustrated with respect to the shoulders of the embodiment of FIG. 22, resulting in the platform 286 lying closer to the support structure to which the feet 282 are attached. Here too, the coupling platform 286 by virtue of the zig-zag pattern 288 provides perpendicular movement relative to the support structure, causing a damping of waves traversing the wall or support structure.

Figure 29:
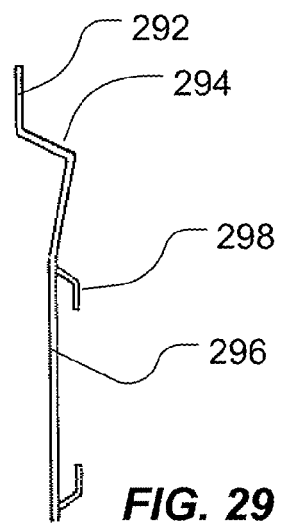
Figure 30:
Figure 31:
Figure 32:

In alternative embodiments, a sound damping device may include a single foot coupled by a shoulder to a coupling platform. For example, FIG. 29 includes an illustration of an exemplary embodiment that includes a single foot 292 connected to a coupling platform 296 by a shoulder 294. The coupling platform 296 includes engagement structures 298 to engage a furring channel. As illustrated, the configuration of the shoulder 294 and coupling platform 296 provides a single footed version of the sound damping embodiment illustrated in FIG. 26. Similarly, the embodiment illustrated in FIG. 30 presents a single footed version of the embodiment illustrated in FIG. 28, FIG. 31 illustrates a single footed embodiment of the embodiment of FIG. 24, FIG. 32 illustrates a single footed embodiment of the embodiment of FIG. 22, FIG. 33 includes a illustration of a single footed embodiment similar to the embodiment illustrated in FIG. 23, and FIG. 34 illustrates of a single footed version of the device illustrated in FIG. 27.

Figure 35:
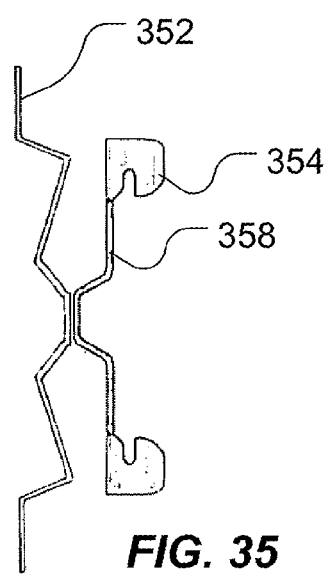
FIG. 35 and FIG. 36 include illustrations of additional exemplary sound damping devices.
Figure 36:
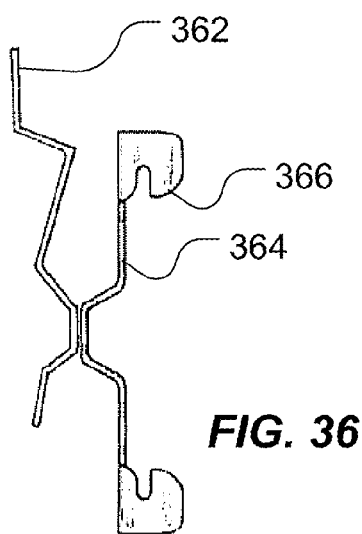

In a further exemplary embodiment, the two footed embodiments or single footed embodiments of the sound damping device may be coupled to a single attachment point sound damping device to provide additional sound damping. For example, as illustrated in FIG. 35, a two footed sound damping device 352 may be coupled to a single attachment point sound damping device 358 which includes the engagement structures 354 for engaging a furring channel. Accordingly, a combination of mechanisms permits the perpendicular movement of the combined sound damping device resulting in additional dissipation of sound waves. In another exemplary embodiment illustrated in FIG. 36, a single footed sound damping device 362 may be coupled to a single attachment point sound damping device 364 which includes engagement structures 366.

In a further exemplary embodiment, a single attachment point sound damping device 372 may be coupled to a base 374, as illustrated in FIGS. 37 and 38. The sound damping device 372 includes an attachment portion 376 connected by shoulders 378 to wings 380. The wings 380 include engagement structures 382 for engaging a furring channel. The attachment portion 376 is connected by a fastener 384 to the base 374. In a particular example, the fastener 384 may permit the sound damping device 372 to pivot relative to the base 374; the attachment portion 376 being rotatably coupled to the base 374.

In an example, the sound damping device 372 is attached to a crossbar 386 of the base 374 that is coupled at one or both ends of the crossbar 386 to the rest of the base 374. In addition, the base 374 may include an elastomeric pad 388 that compresses when the base 374 is coupled to a support structure. For example, in the illustrated embodiment, the base 374 may be coupled to the support structure using fasteners extending through holes 389. For example, the fasteners may include rivets, nails, screws, or bolts, or any combination thereof. Alternatively, the base 374 may be coupled to a support using adhesive. As such, the device illustrated in FIG. 37 and FIG. 38 implements several sound damping features such as the flexibility of the device 372, the additional flexibility provided by the crossbar 386, and the further presence of the elastomeric portion 388.

In a further alternative, a sound damping device may be implemented as a channel. In particular, the channel may be implemented with attachment portions, including a single foot or two feet, and may include one or more folds or s-shaped curves distributed between the shoulders extending to the coupling platforms from the feet. For example, FIG. 39 illustrates a single footed embodiment and FIG. 40 illustrates a two footed embodiment of a system that includes a foot 392, a shoulder 394, and a coupling platform 396. The coupling platform 396 may be configured to contact directly, a wall structure. For example, the coupling platform 396 may be directly adhered or fastened to the wall structure, such as through an adhesive or fasteners. Extending between the shoulder 394 and the support 396 are one or more folds 398. In general, folds are characterized by a change in direction of the material from a side view, which result from bending as opposed to cutting. In particular, the channel may include at least two folds, such as at least three folds, at least four folds, or even at least five folds extending between the attachment portion and the coupling platform. In the embodiment illustrated in FIG. 39 and FIG. 40, two folds 398 form a transition between the shoulder 394 and the coupling platform 396. The folds 398 present openings directed perpendicular to the planes defined by the foot 392 and platform 396.

Figure 42:
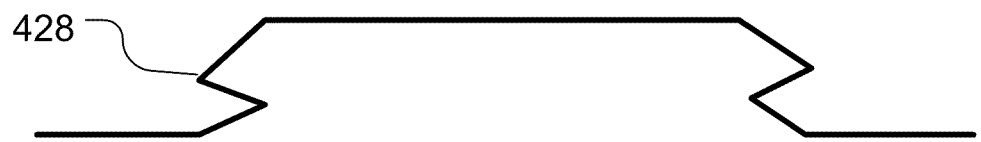
Figure 43:
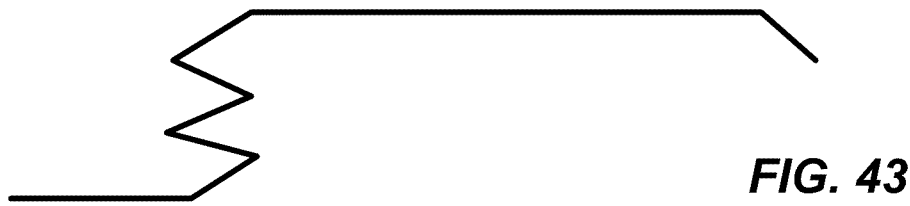
Figure 44:
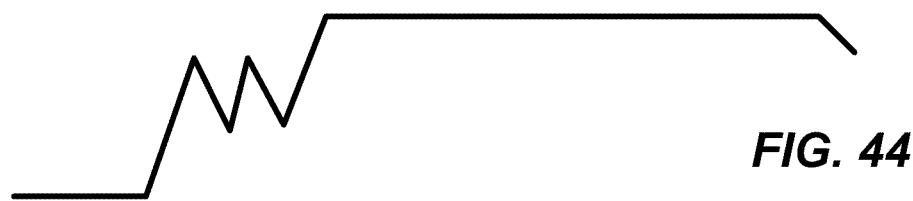

As illustrated in FIG. 41 and FIG. 42, a single footed embodiment and a two footed embodiment include folds 428 that open in a direction parallel to the planes of the feet and the coupling platform. An embodiment illustrated in FIG. 43 includes a larger number of folds opening parallel to the plane of the feet. In an alternative embodiment illustrated in FIG. 44, the folds open in a direction perpendicular to the plane of the foot.

Figure 45:
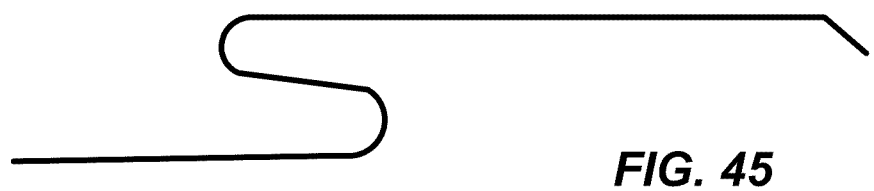

In an alternative embodiment, illustrated in FIG. 45, the folds 468 form an S pattern when transitioning from the shoulder to the coupling platform. As illustrated, the folds open parallel to the plane of the foot. Alternatively, the folds may open perpendicular to the plane of the foot. Each of the embodiments illustrated in FIG. 43 or FIG. 44 or FIG. 45 may be implemented as single foot embodiments or two foot embodiments.

In an exemplary embodiment, the channel can be formed of materials such as metals, polymers, or composite materials. For example, the channel may be formed of a metal, such as steel, aluminum, bronze, copper, tin, titanium, zinc, alloys thereof, or any combination thereof. Optionally, the metals may be treated or coated, such as with a metal or metal oxide plating or a polymeric coating. Alternatively, the channel may be formed of a polymeric material, such as a material including a polyolefin, a polyamide, a diene elastomer, a polyester, a polyether, a polyaramide, a polyimide, a silicone, or any combination thereof. Further, the channel may be formed of a composite material, such a filled polymer, including a filler such as a metal oxide, another polymer, a metal particulate, graphite, a flame retardant, another additive, or any combination thereof, or may be formed of a metal/elastomer laminate.

In particular, the illustrated channels may be formed by cutting and shaping a sheet of material, such as a metal sheet. For example, the channels may be cut and bent into shape. In an example, the sheet may be cut to form an intermediate piece or component, and the intermediate piece may be bent to form the channel. In particular, the channels may be formed of a single piece of material, such as metal, cut and bent to form the feet, shoulders, and coupling platforms. Alternatively, the channel may be formed of a moldable material and may be manufactured through a technique, such as injection molding, compression molding, other molding techniques, or any combination thereof.

In a particular example, the channel may be formed of sheet material having a thickness in a range of 5 gauge to 200 gauge, such as a range of 20 gauge to 150 gauge, a range of 20 gauge to 125 gauge, or even a range of 20 gauge to 100 gauge. In particular, the thickness of the material is selected to provide a balance between flexibility which assists with sound dampening and strength useful for supporting the sheet material. For example, the material may be selected in combination with design to support at least 10 lbs of sheet material, such as at least 20 lbs of sheet material, at least 25 lbs of sheet material, at least 30 lbs of sheet material, at least 35 lbs of sheet material, or even at least 50 lbs of sheet material. The channel is generally configured to support not greater than 100 lbs of sheet material. The channel may have a height and length described above in relation to sound damping devices.

In an embodiment, the channel may have a spring rate of not greater than 40,000 kg/m. The spring rate is the ratio of load to deflection measured with a load sufficient to cause a deflection of 1 mm. In particular, the channel may have a spring rate of not greater than 35,000 kg/m, such as not greater than 30,000 kg/m, not greater than 25,000 kg/m, not greater than 20,000 kg/m, not greater than 15,000 kg/m, not greater than 12,000 kg/m, not greater than 10,000 kg/m, or even not greater than 7000 kg/m. In an example, the channel is formed of a sheet metal construction having a configuration as illustrated in FIGS. 39 to 45 and having a spring rate listed above. In a particular example, the sound damping device has a spring rate of at least 100 kg/m, such as at least 500 kg/m, or even at least 1000 kg/m.

In addition, the channel provides a Resonance Index of not greater than 65 Hz. The Resonance Index is determined as the resonance frequency for a wall including a sheet of ⅝" drywall on each side of a wood frame. The channel is disposed between one of the sheets of ⅝" drywall and a side of the wood frame. In particular, the sound damping device exhibits a Resonance Index of not greater than 60 Hz, such as in a range of 50 Hz to 60 Hz.

Particular embodiments of the devices described provide technical advantages over prior art sound damping devices. In particular, embodiments of the above describe sound damping devices exhibit a desirable Transmission Loss Performance. The method for determining Transmission Loss Performance is described in relation to Example 3 below. For example, the Transmission Loss Performance at 125 Hz may be at least 37 dB, such as at least 39 dB, or even at least 40 dB. Further, embodiments provide a Transmission Loss Performance at 800 Hz of at least 63 dB, such as at least 64 dB, or even at least 65 decibels.

Further, embodiments of the above described sound damping devices and channels have a spring rate in a range that provides for a low resonance frequency in wall and ceiling structures, while providing enough strength to support sheet material forming the wall or ceiling. Low spring rate may have a nexus with the desired Transmission Loss Performance at low and mid-frequency ranges. In addition, such embodiments are easy to manufacture and easy to use in construction.

EXAMPLES

Example 1

Transmission loss is determined for sample walls that include sound damping devices and for comparative walls free of the sound damping device. A comparative wall is prepared using a sheet of ⅝" Type X Drywall coupled using wood screws to each side of wood studs absent sound damping devices. Experimental samples are prepared by connecting one piece of drywall to one side of the wood studs directly using wood screws and connecting a second piece of drywall to ⅞" furring channels engaged with sound damping devices as illustrated in FIG. 11. The sound damping devices are coupled using wood screws to wood studs.

Figure 46:
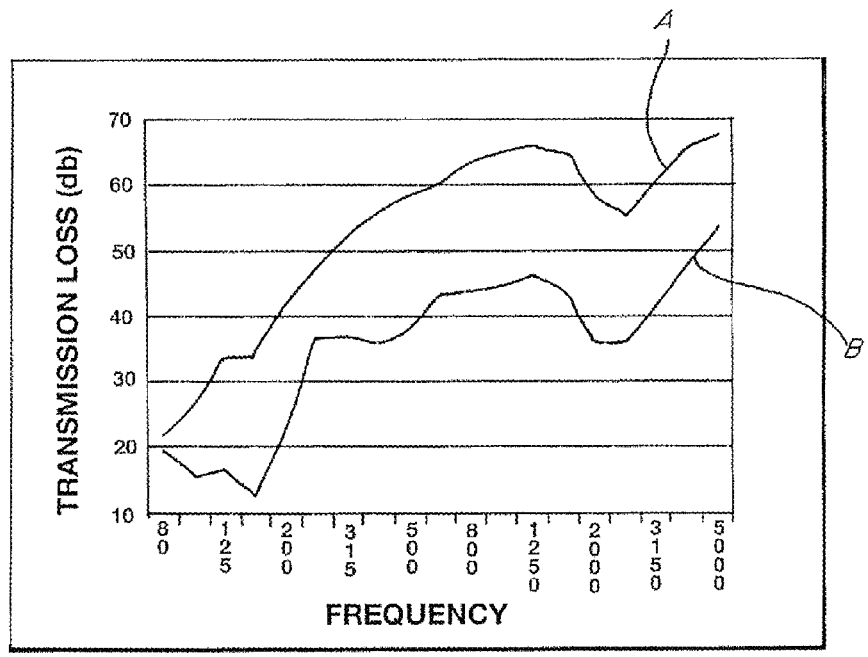
FIG. 46, FIG. 47, FIG. 48, and FIG. 49 include graphs of transmission loss associated with exemplary sound damping devices.

As illustrated in FIG. 46, the wall including the sound damping device (line A) exhibits significantly more transmission loss than the wall absent the sound damping device (line B). Accordingly, the sound damping device provides enhanced sound damping particularly for low frequencies between 80 hertz and 200 hertz and for the mid-range frequencies between 600 hertz and 1000 hertz.

Example 2

Using the commercially available sound damping devices (PAC RSIC-1 and Kinetics Isomax) and a sound damping device illustrated in FIG. 11, transmission loss measurements are made for configurations that include either a single sheet of drywall on both sides of the frame (i.e., one sheet directly connected to the frame and one sheet connected to a furring channel) or double sheets on both sides of the frame (i.e., two sheets directly connected to the frame on one side and two sheets connected to a furring channel).

Figure 50:
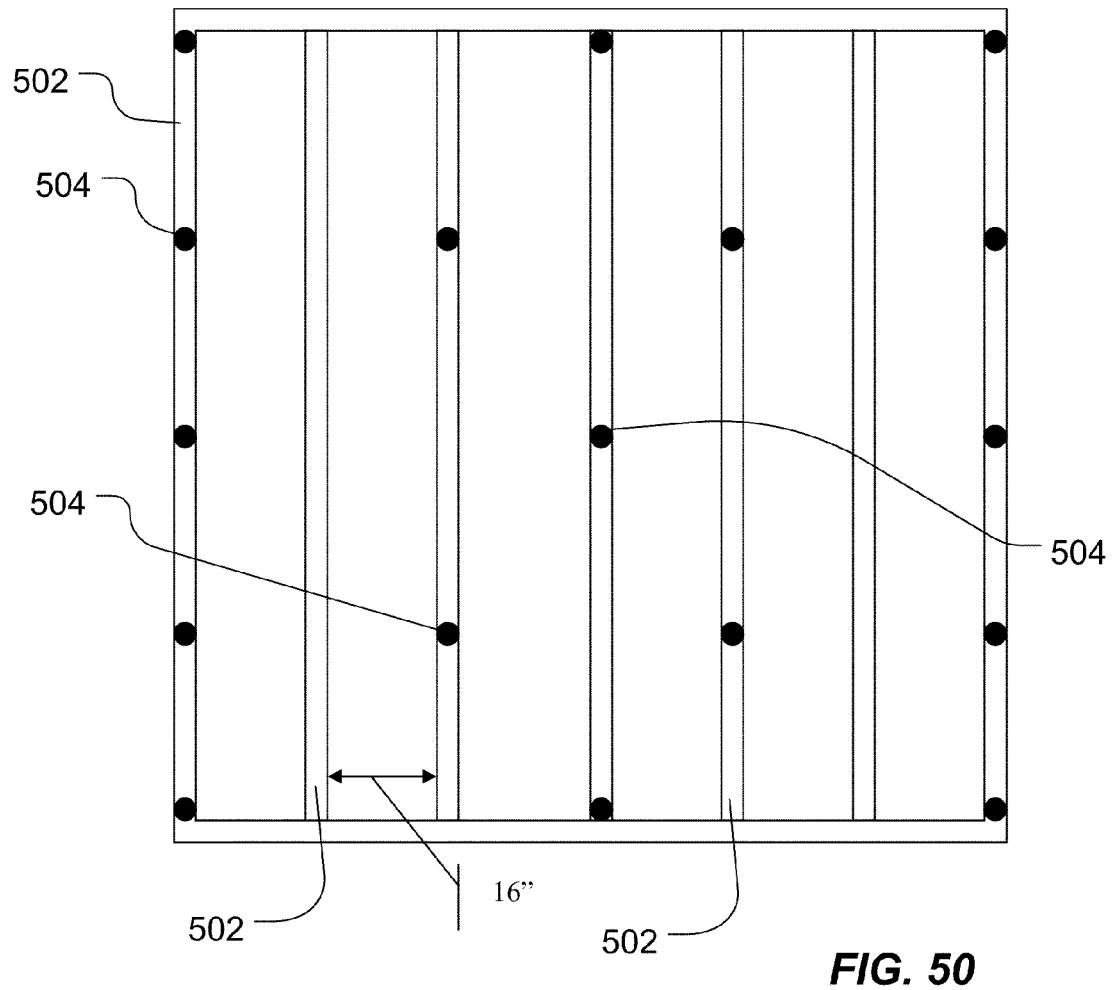
FIG. 50 includes an illustration of an experimental configuration to measure Transmission Loss Performance.

Sample walls are prepared that include one or two sheets of ⅝" Type X Drywall secured to a wood frame with wood screws. One or two sheets of drywall are also secured to ⅞" drywall furring channels, which are couple to the sound damping devices. The sound damping devices are secured to the wood frame and arranged as illustrated in FIG. 50

Figure 47:
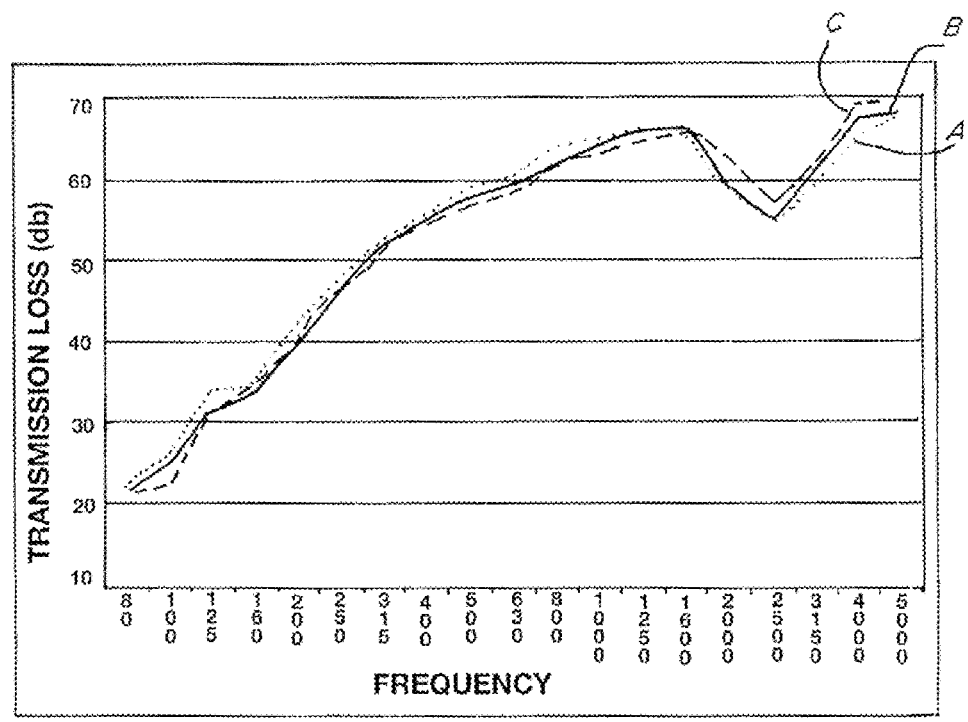
Figure 48:
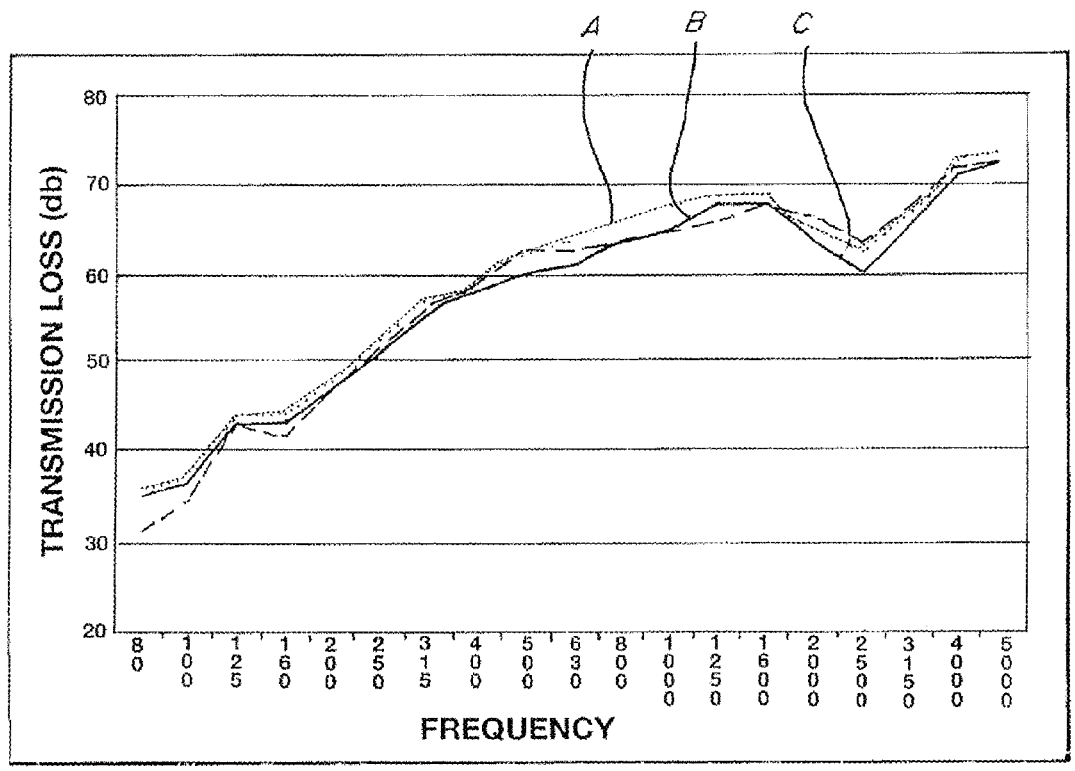

As illustrated in FIG. 47 (single sheet) and in FIG. 48 (double sheet), the embodiment of the sound damping device illustrated in FIG. 11(A) provides greater transmission loss than the PAC RSIC-1 (B) and Kinetics Isomax (C) devices.

Example 3

A comparison between commercially available sound damping devices (PAC RSIC-1 and Kinetics Isomax) and the sound damping device illustrated in FIG. 37 and FIG. 38 is provided. Walls are prepared in which a sheet of ⅝" Type X Drywall is directly connected to a wood frame on one side using wood screws. The wood frame is an 8 feet by 8 feet section formed by wood 2×4 studs (1.5" wide by 3.5" deep) spaced 16" apart. R19 fiberglass insulation is disposed between studs. Clips (illustrated as dots 504) are placed on the studs 502, as illustrated in FIG. 50. Two sheets of ⅝" Type X Drywall panels are connected to a ⅞" drywall furring channel that is connected to a sound damping device. The sound damping device is connected to the wood frame on a side opposite the directly connected sheet of drywall. Transmission loss measured in decibels is measured for sound frequencies between 80 Hz and 5000 Hz. Transmission Loss Performance for a particular frequency is the transmission loss (in dB) measured using the configurations described above.

Figure 49:
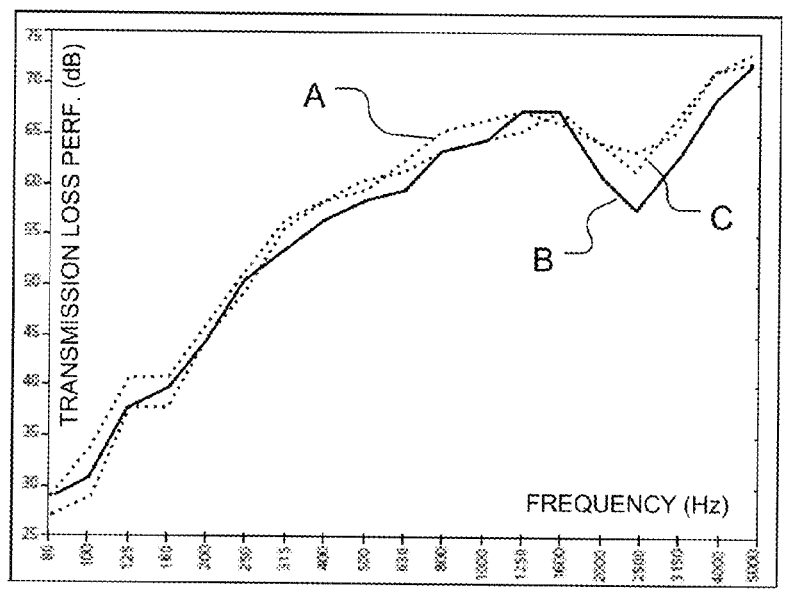

As illustrated in FIG. 49, the sound damping device of FIG. 37 and FIG. 38(A) provides enhanced Transmission Loss Performance at frequencies in the range of 80-160 Hz and in the range of 600 Hz to 1000 Hz relative to the PAC RSIC-1 (B) and Kinetics Isomax (C) devices. In other frequency ranges, the present sound damping device provides comparable performance to the other commercially available devices.

Figure 51:
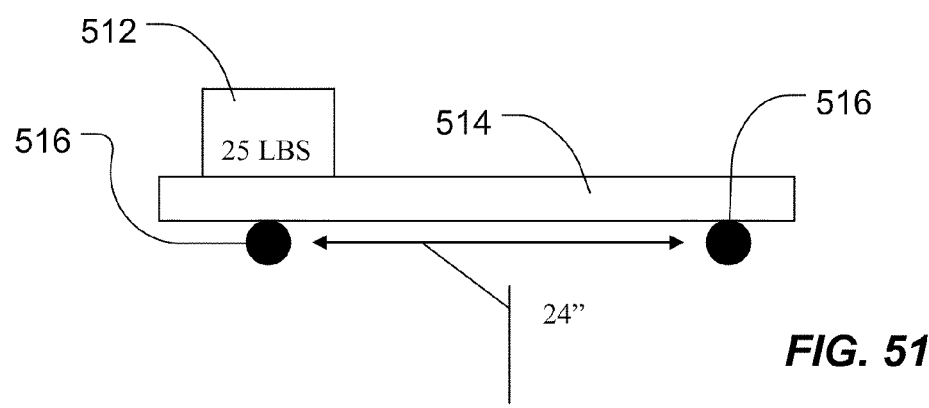
FIG. 51 includes an illustration of an experimental configuration to measure spring rate.

Further, the commercial samples and the sound damping device of FIG. 11 or FIG. 37 are measured for spring rate using the test illustrated in FIG. 51. Two devices 516 are disposed 24 inches apart. A hat channel 514 is coupled to each of the devices 516, and a 25 lb weight 512 is placed on one end of the hat channel. Deflection is measured adjacent the device closest to the 25 lb weight. As illustrated in Table 1, the present sound damping device illustrated in FIG. 37 exhibits the lowest spring rate.

TABLE 1

Spring Rate of Samples

| Sample | Spring Rate |
|---|---|
| PAC RSIC-1 | 12,500 kg/m |
| Kinetics Isomax | 18,000 kg/m |
| Sample (FIG. 11) | 5700 kg/m |
| Sample (FIG. 37) | 4500 kg/m |

Example 4

Figure 33:
Figure 34:

A sample of the embodiment illustrated in FIG. 33 is tested for transmission loss using the procedure described in EXAMPLE 3 with the exception that R13 fiberglass insulation is used. PAC RSIC-1 is also tested for comparison. Table 2 illustrates the transmission loss as a function of frequency. As illustrated, the present sample provides greater transmission loss at low frequencies than the PAC RSIC-1 sample.

TABLE 2

Transmission Loss (dB)

| Frequency (Hz) | PAC RSIC-1 | Sample (FIG. 33) |
|---|---|---|
| 63 | 12.6 | 18.2 |
| 80 | 17.1 | 19.5 |
| 100 | 22.3 | 24.1 |
| 125 | 29 | 30.8 |
| 160 | 32.6 | 34.5 |
| 200 | 37.6 | 39.4 |
| 250 | 43.6 | 45 |
| 315 | 48.6 | 50 |
| 400 | 51.1 | 51.5 |
| 500 | 52.8 | 53.5 |
| 630 | 54.7 | 56.3 |
| 800 | 56.7 | 58 |
| 1000 | 58 | 59.5 |
| 1250 | 61.7 | 62.6 |
| 1600 | 61.3 | 61.6 |
| 2000 | 54.9 | 53.6 |
| 2500 | 55 | 54.9 |
| 3150 | 61.8 | 58.6 |
| 4000 | 67.7 | 65.2 |
| 5000 | 70.5 | 70.7 |

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A sound damping device comprising:
    an attachment portion that lies along a plane P1, has a central axis A perpendicular to the plane P1, and has a length L1;
    a shoulder that extends from the attachment portion out of the plane P1 at an oblique angle to a plane P2 and has a length L2;
    a wing that extends from the shoulder along the P2 to an end, has a length L3 in a first direction from the shoulder to the end, has a first portion near the shoulder, and has a second portion near the end, wherein the second portion is wider than the first portion in a second direction perpendicular to the first direction; and
    an engagement structure disposed on a major surface of the wing facing away from the plane P1, the engagement structure comprising opposing segments bent from opposing lateral edges of the second portion of the wing so as to extend out of the plane P2 in an axial direction relative to the central axis A away from the plane P1 so as to define a channel between the opposing segments and over the major surface of the wing facing away from the plane P1,
    wherein the wing is configured to flex in response to vibrations and to dissipate sound waves with a Transmission Loss Performance of at least 37 dB at 125 Hz;
    wherein a ratio of the length L3 to the length L1 is at least 1, and the length L3 is greater that the length L2, and
    wherein the sound damping device is formed of a single metal piece.

2. The sound damping device of claim 1, wherein the sound damping device has a spring rate of not greater than 10,000 kg/m.

3. The sound damping device of claim 2, wherein the spring rate is not greater than 7,000 kg/m.

4. The sound damping device of claim 1, further comprising a base, the attachment portion secured to the base.

5. The sound damping device of claim 1, wherein the sound damping device has a Resonance Index of not greater than 65 Hz.

6. The sound damping device of claim 1, wherein the shoulder includes at least two folds.

7. The sound damping device of claim 6, wherein the shoulder includes at least 4 folds.

8. A structure comprising:
a support;
a sound damping device coupled to the support, the sound damping device comprising:
an attachment portion that lies within a plane P, has an axis A perpendicular to the plane P, and has a length L1;
a shoulder that extends from the attachment portion out of the plane P1 and has a length L2;
a wing that extends from the shoulder along the plane P2 to an end, the wing extending from the shoulder at an angle β of not greater than 175° relative to the shoulder, and the wing having a length L3 in a first direction from the shoulder to the end, having a first portion near the shoulder, and having a second portion near the end, wherein the second portion is wider than the first portion in a second direction perpendicular to the first direction; and
an engagement structure disposed on a major surface of the wing near facing away from the plane P1, the engagement structure compromising opposing segments bent from opposing lateral edges of the second portion of the wing and each of the segments extending out of the plane P2 in an axial direction relative to the central axis A away from the plane P1 so as to define a channel between the opposing segments and over the major surface of the wing facing away from the plane P1;
wherein a ratio of the length L3 to the length L1 is at least 1, and the length L3 is greater than the length L2,
wherein the sound damping device is formed of a single metal piece, and;
a furring channel coupled to the engagement structure of the sound damping device; and
a sheet material coupled to the furring channel,
wherein the structure is adapted such that the wing can flex in a direction perpendicular to the plane P with a spring rate of not greater than 12,000 kg/m.

9. The structure of claim 8, wherein the spring rate is not greater than 10,000 kg/m.

10. The structure of claim 8, wherein the sound damping device exhibits a Resonance Index of not greater than 65 Hz.

11. A sound damping device comprising:
an attachment portion lying along a plane P and having a length L1;
first and second shoulders disposed on opposite sides of the attachment portion within the plane and extending from the same surface of the plane P, the first and second shoulders each having a length L2;
first and second wings extending from the first and second shoulders, in a first direction, to a first end and a second end respectively, in different directions substantially parallel to the plane P, each of the first and second wings having a length L3, and having a first portion near the first shoulder and the second shoulder, respectively, and having a second portion near the first end and the second end, respectively, wherein each second portion is wider than each first portion in a second direction perpendicular to the first direction
first and second engagement structures disposed on a major surface of the first and second wings, respectively, facing away from the plane P, the first and second engagement structures adapted to receive a furring channel such that the wings can flex in response to vibrations and to dissipate sound waves with a Transmission Loss Performance of at least 63 dB at 800 Hz,
wherein a ratio of the length L3 to the length L1 is at least 1, and the length L3 is greater than the length L2,
wherein the sound damping device is formed of a single metal piece.

12. The sound damping device of claim 11, wherein the first and second engagement structures each comprise a notch to receive an edge of a furring channel.

13. The sound damping device of claim 1, wherein the sound damping device has a Transmission Loss performance of at least 63 dB at a 800 Hz.

14. The sound damping device of claim 1, wherein the opposing segments of the engagement structure include notches opening toward the central axis A and extending into the thickness of the segments in the first direction.

15. The sound damping device of claim 1, wherein a maximum width of the wing is greater than a maximum width of the attachment portion.

* * * * *

UNITED STATES PATENT AND TRADEMARK OFFICE
CERTIFICATE OF CORRECTION

PATENT NO. : 9,045,898 B2  
APPLICATION NO. : 12/466915  
DATED : June 2, 2015  
INVENTOR(S) : Ravnaas Page 1 of 1

It is certified that error appears in the above-identified patent and that said Letters Patent is hereby corrected as shown below:

In the Claims

Column 14, Line 22: please add a ";" after the word "direction".

Signed and Sealed this  
Third Day of May, 2016

Michelle K. Lee  
*Director of the United States Patent and Trademark Office*